United States Patent Office 3,053,840
Patented Sept. 11, 1962

3,053,840
11-OXYGENATED POLYDEHYDRO 17-CARBOXY-ETHYL-9-HALO - 17 - HYDROXYANDROSTAN-3-ONE LACTONES
Edward A. Brown, Wilmette, Ill., assignor to G. D. Searle & Co., Chicago, Ill., a corporation of Delaware
No Drawing. Filed June 23, 1960, Ser. No. 38,139
8 Claims. (Cl. 260—239.57)

This invention relates to 11-oxygenated polydehydro 17 - carboxyethyl - 9 - halo - 17 - hydroxyandrostan - 3-one lactones and processes for the manufacture thereof. More particularly, this invention relates to chemical compounds of the formula

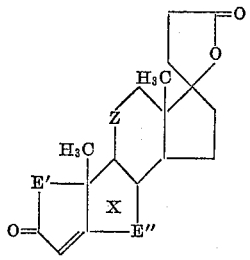

wherein Z represents a carbonyl or hydroxymethylene radical, X represents halogen in the 9-position, and E' and E" each represent an ethylene or vinylene radical, at least one being vinylene.

As between $\alpha$ and $\beta$ (relative to configuration of hydroxyl on the steroid nucleus) hydroxymethylene radicals represented by Z in the formula, a $\beta$-hydroxymethylene group is preferred; and among the halogens, X, an $\alpha$-fluoro or corresponding chloro or bromo substituent is most desirable. It follows from the definitions of E' and E" that the compounds hereof are $\Delta^{1,4}$, $\Delta^{4,6}$ or $\Delta^{1,4,6}$ steroids, depending upon whether one or both of E' and E" represent vinylene radicals.

Equivalent to the described lactones for the purposes of this invention are the correlative hydroxy acids and their salts, of the formula

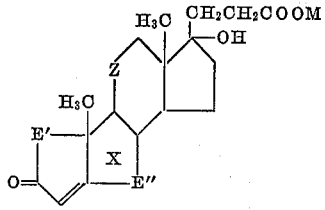

wherein Z, X, E', and E" are defined as before and M represents hydrogen, an alkali metal, or the ammonium radical. Likewise equivalent are the alkaline earth salts of the foregoing hydroxy acids.

Those skilled in the art will recognize that the salts set forth readily derive from the opposite lactones on contact with appropriate aqueous bases, for example, KOH, NaOH, NH$_4$OH, Ca(OH)$_2$, etc. The free acids, in turn, are obtained from the salts by a critically brief exposure to a proton source. Prolongation of the exposure time induces lactonization.

The compounds to which this invention relates are useful by reason of their valuable pharmacological properties. Especially, they are prized for the selective capacity to block the effect of desoxycorticosterone acetate on urinary sodium and potassium.

Manufacture of the $\Delta^{1,4}$ and $\Delta^{1,4,6}$ lactones hereof proceeds by heating corresponding $\Delta^4$ or $\Delta^{4,6}$ lactones, respectively, with 2,3-dichloro-5,6-dicyanobenzoquinone in a suitable solvent such as dioxane. The $\Delta^{4,6}$ lactones, on the other hand, are obtained from $\Delta^4$ analogs upon contact with manganese dioxide in toluene or like medium at room temperatures.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, relative amounts of materials are given in parts by weight, except as otherwise noted.

Example 1

17$\alpha$ - (2 - carboxyethyl)-9$\alpha$-fluoro-11$\beta$,17$\beta$-dihydroxyandrosta-1,4-dien-3-one $\gamma$-lactone.—A mixture of 30 parts of 17$\alpha$-(2 - carboxyethyl) - 9$\alpha$-fluoro-11$\beta$,17$\beta$-dihydroxyandrost-4-en-3-one $\gamma$-lactone (U.S. 2,925,416) and 20 parts of 2,3-dichloro-5,6-dicyanobenzoquinone in 2400 parts of dioxane is heated at the boiling point under reflux overnight. Solvent is removed by vacuum distillation, and the residue is taken up in ethyl acetate. The resultant solution is trickled through silica to remove excess benzoquinone. Concentration to the point of incipient turbidity is thereupon effected, whereupon the desired 17$\alpha$ - (2 - carboxyethyl) - 9$\alpha$ - fluoro - 11$\beta$,17$\beta$ - dihydroxyandrosta-1,4-dien-3-one $\gamma$ - lactone precipitates. Filtered off and dried in air, this material is characterized, when incorporated in a potassium bromide disk, by infrared absorption peaks at 2.76, 5.63, 5.98, and 6.15 microns. The product has the formula

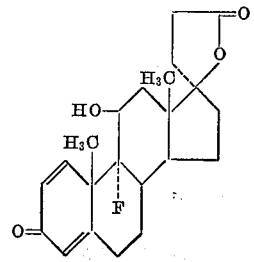

Example 2

9$\alpha$ - bromo - 17$\alpha$ - (2 - carboxyethyl) - 11$\beta$,17$\beta$ - dihydroxy-androsta-1,4-dien-3-one $\gamma$-lactone.—By the procedure of Example 1, modified only to the extent that 35 parts of 9$\alpha$-bromo-17$\alpha$-(2-carboxyethyl)-11$\beta$,17$\beta$-dihydroxyandrost-4-en-3-one $\gamma$-lactone (U.S. 2,925,416) are substituted for the 17$\alpha$-(2-carboxyethyl)-9$\alpha$-fluoro-11$\beta$, 17$\beta$-dihydroxyandrost4-en-3-one $\gamma$-lactone therein and the reactants are heated at 65° for 4 hours rather than at the boiling point overnight, one obtains 9$\alpha$-bromo-17$\alpha$-(2 - carboxyethyl) - 11$\beta$,17$\beta$ - dihydroxyandrosta - 1,4-dien-3-one $\gamma$-lactone, of the formula

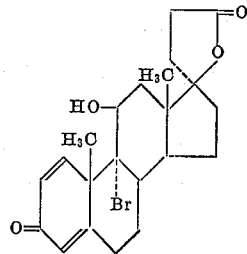

Example 3

17$\alpha$ - (2 - carboxyethyl) - 9$\alpha$ - floro - 17$\beta$ - hydroxy-androsta - 1,4 - diene - 3,11 - dione $\gamma$-lactone.—Substitution of an identical quantity of 17$\alpha$-(2-carboxyethyl)-

9α - fluoro - 17β - hydroxyandrost - 4 - ene - 3, 11 - dione γ-lactone (U.S. 2,925,416) for the 17α-(2-carboxyethyl)-9α - fluoro - 11β,17β - dihydroxyandrost - 4 - en - 3 - one γ-lactone called for in Example 1 affords, by the procedure there detailed, 17α-(2-carboxyethyl)-9α-fluoro-17β - hydroxyandrosta - 1,4 - dien - 3,11 - dione γ-lactone. Incorporated in a potassium bromide disk, the product is characterized by absorption peaks in the infrared spectrum at 5.63, 5.76, 5.97, and 6.15 microns. The product has the formula

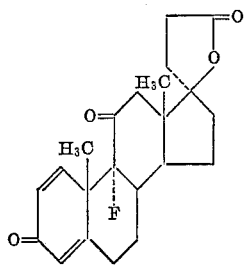

*Example 4*

9α - bromo - 17α - (2 - carboxyethyl) - 17β - hydroxyandrosta-1,4-diene-3,11-dione γ-lactone.—By the procedure of Example 1, modified only to the extent that 35 parts of 9α-bromo-17α-(2-carboxyethyl)-17β-hydroxyandrost-4-ene-3,11-dione γ-lactone (U.S. 2,925,416) are substituted for the 17α-(2-carboxyethyl)-9α-fluoro-11β, 17β-dihydroxy-androst-4-en-3-one γ-lactone therein and the reactants are heated at 65° for 4 hours rather than at the boiling point overnight, one obtains 9α-bromo-17α-(2-carboxyethyl)-17β-hydroxyandrosta-1,4-diene-3,11 - dione γ-lactone, of the formula

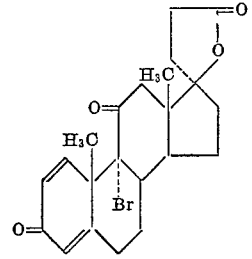

*Example 5*

A. *17α - (2 - carboxyethyl) - 9α - chloro - 11β,17β-dihydroxyandrost-4-en-3-one γ-lactone.*—To a mixture of 108 parts of 17α-(2-carboxyethyl)-17β-hydroxyandrosta-4,9(11)-dien-3-one γ-lactone (U.S. 2,925,416) and 50 parts of N-chloroacetamide in 1700 parts of peroxide-free dioxane is added, with agitation at room temperatures during approximately 5 minutes, 17 parts of perchloric acid dissolved in 170 parts of water. When the addition is complete, agitation is continued 10 minutes longer, at which point 5800 parts of aqueous 2% sodium bisulfite is stirred in; and the resultant mixture is chilled. The 17α - (2 - carboxyethyl) - 9α - chloro - 11β,17β - dihydroxyandrost-4-en-3-one γ-lactone thus precipitated is collected on a filter, washed thereon with water, and dried in air.

B. *17α - (2 - carboxyethyl) - 9α - chloro - 3 - ethoxyandrosta-3,5-diene-11β,17β-diol γ-lactone.*—To a solution of 210 parts of 17α-(2-carboxyethyl)-9α-chloro-11β,17β-dihydroxyandrost-4-en-3-one γ-lactone in 1000 parts of purified dioxane is added, consecutively with agitation, 198 parts of ethyl orthoformate, 64 parts of absolute ethanol, and 2 parts of p-toluenesulfonic acid monohydrate. The resultant mixture is maintained at room temperatures for 1½ hours, whereupon 10 parts of pyridine and 10 parts of sodium acetate are introduced, and solvent is then removed by vacuum distillation. Crystallization of the residue from ethanol affords the desired 17α-(2 - carboxyethyl) - 9α - chloro - 3 - ethoxyandrosta-3,5-diene-11β,17β-diol γ-lactone.

C. *17α - (2 - carboxyethyl) - 9α - chloro - 11β,17β-dihydroxyandrosta-4,6-dien-3-one γ-lactone.*—A solution of 2 parts of 17α-(2-carboxyethyl)-9α-chloro-3-ethoxyandrosta-3,5-diene-11β,17β-diol γ-lactone in 180 parts of toluene is agitated during 1 hour at room temperatures with 10 parts of freshly prepared manganese dioxide. The resultant mixture is filtered, and the filtrate is stripped of solvent by vacuum distillation. The residue is the desired 17α-(2-carboxyethyl)-9α-chloro - 11β,17β - dihydroxyandrosta-4,6-dien-3-one γ - lactone which, incorporated in a potassium bromide disk, manifests peaks in the infrared spectrum at 2.79, 5.63, 6.0, and 6.18 microns. The product has the formula

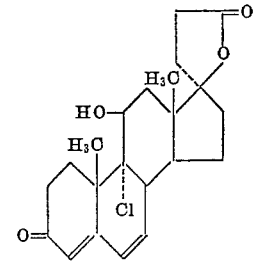

*Example 6*

A. *17α-(2 - carboxyethyl)-3-ethoxy-9α-fluoroandrosta-3,5-diene-11β,17β-diol γ-lactone.*—Substitution of 200 parts of 17α-(2-carboxyethyl)-9α-fluoro-11β,17β-dihydroxyandrost-4-en-3-one γ-lactone for the 210 parts of 17α - (2 - carboxyethyl) - 9α - chloro - 11β,17β - dihydroxyandrost-4-en-3-one γ-lactone called for in Example 5B affords, by the procedure there detailed, 17α-(2-carboxyethyl) - 3 - ethoxy - 9α - fluoroandrosta - 3,5 - diene-11β,17β-diol γ-lactone.

B. *17α - (2 - carboxyethyl) - 9α - fluoro - 11β,17β - dihydroxyandrosta-4,6-dien-3-one γ-lactone.*—A solution of 20 parts of 17α-(2-carboxyethyl)-3-ethoxy-9α-fluoroandrosta-3,5-diene-11β,17β-diol γ-lactone in 2000 parts of toluene is mixed at room temperatures during 1 hour with 100 parts of manganese dioxide. The resultant mixture is filtered, and the filtrate is stripped of solvent by vacuum distillation. The residue is 17α-(2-carboxyethyl) - 9α - fluoro - 11β,17β - dihydroxyandrosta - 4,6-dien-3-one γ-lactone, of the formula

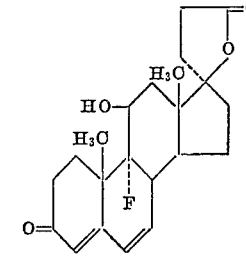

*Example 7*

*17α - (2 - carboxyethyl) - 9α - fluoro - 11β,17β - dihydroxyandrosta - 1,4,6-trien-3-one γ-lactone.*—The 17α-(2 - carboxyethyl) - 9α-fluoro - 11β,17β - dihydroxyandrosta-4,6-dien-3-one γ-lactone obtained in the preceding Example 6B is taken up in approximately 1800 parts of dioxane, and the resultant solution is heated at the boiling point under reflux with 13 parts of 2,3-dichloro-5,6-dicyanobenzoquinone. After 15 hours, heating is discontinued; and the solvent is removed by vacuum distillation. The residue is dissolved in ethyl acetate, and the solution this obtained is passed through a bed of silica to remove excess benzoquinone. Sufficient concentration of the resultant solution to induce incipient turbidity and subsequent chilling causes precipitation of the desired 17α - (2 - carboxyethyl) - 9α - fluoro - 11β,17β - dihydroxyandrosta-1,4,6-trien-3-one γ-lactone, which is removed on a filter and dried in air. A chloroform solution of the product is characterized by peaks in the infrared spectrum at 2.77, 5.65, 6.04, and 6.24 microns. The product has the formula

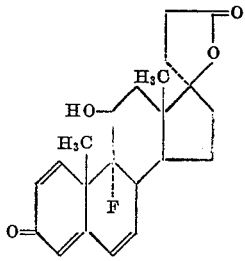

What is claimed is:
1. A compound of the formula

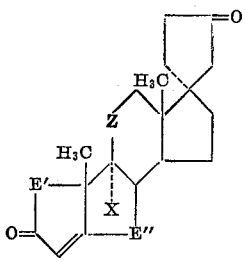

wherein Z is selected from the group consisting of β-hydroxymethylene and carbonyl radicals, X is halogen of atomic number less than 53, and E' and E" are so selected from the group consisting of ethylene and vinylene radicals that at least one is a vinylene radical.

2. A compound of the formula

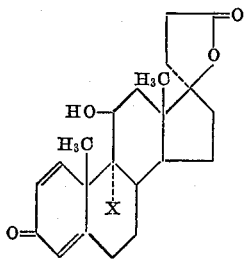

wherein X is halogen of atomic number less than 53.

3. 17α-(2-carboxyethyl)-9α-fluoro-11β,17β - dihydroxyandrosta-1,4-dien-3-one γ-lactone.

4. A compound of the formula

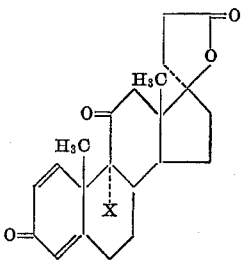

wherein X is halogen of atomic number less than 53.

5. 17α-(2-carboxyethyl)-9α - fluoro - 17β - hydroxyandrosta-1,4-diene-3,11-dione γ-lactone.

6. A compound of the formula

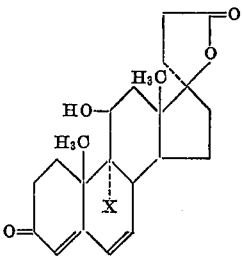

wherein X is halogen of atomic number less than 53.

7. 17α-(2-carboxyethyl) - 9α - chloro - 11β,17β - dihydroxyandrosta-4,6-dien-3-one γ-lactone.

8. 17α-(2-carboxyethyl) - 9α - fluoro - 11β,17β - dihydroxyandrosta-1,4,6-trien-3-one γ-lactone.

References Cited in the file of this patent

UNITED STATES PATENTS

| | | |
|---|---|---|
| 2,837,464 | Nobile | June 3, 1958 |
| 2,925,416 | Brown et al. | Feb. 16, 1960 |

UNITED STATES PATENT OFFICE
CERTIFICATE OF CORRECTION

Patent No. 3,053,840                    September 11, 1962

Edward A. Brown

It is hereby certified that error appears in the above numbered patent requiring correction and that the said Letters Patent should read as corrected below.

Column 1, line 72, after "from" insert -- 3-enol ethers of their --.

Signed and sealed this 15th day of January 1963.

(SEAL)
Attest:

ERNEST W. SWIDER
Attesting Officer

DAVID L. LADD
Commissioner of Patents